(12) United States Patent
Skog et al.

(10) Patent No.: US 8,127,028 B2
(45) Date of Patent: Feb. 28, 2012

(54) METHOD AND ARRANGEMENT OF A MULTIMEDIA GATEWAY AND COMMUNICATION TERMINALS

(75) Inventors: Robert Skog, Hasselby (SE); Justus Petersson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 172 days.

(21) Appl. No.: 12/678,295

(22) PCT Filed: Sep. 17, 2007

(86) PCT No.: PCT/SE2007/050658
§ 371 (c)(1), (2), (4) Date: Mar. 16, 2010

(87) PCT Pub. No.: WO2009/038506
PCT Pub. Date: Mar. 26, 2009

(65) Prior Publication Data
US 2010/0205309 A1 Aug. 12, 2010

(51) Int. Cl.
*G06F 15/16* (2006.01)
(52) U.S. Cl. .......... 709/228; 709/229
(58) Field of Classification Search .......... 709/218, 709/228, 229
See application file for complete search history.

(56) References Cited

U.S. PATENT DOCUMENTS

| | | | |
|---|---|---|---|
| 7,626,950 B2* | 12/2009 | Wright et al. | 370/260 |
| 7,831,278 B2* | 11/2010 | Want et al. | 455/557 |
| 2002/0103850 A1* | 8/2002 | Moyer et al. | 709/202 |
| 2002/0191635 A1* | 12/2002 | Chow et al. | 370/463 |
| 2006/0126603 A1 | 6/2006 | Shimizu et al. | |
| 2007/0195805 A1* | 8/2007 | Lindgren | 370/401 |
| 2010/0070636 A1* | 3/2010 | Skog et al. | 709/228 |
| 2010/0135279 A1* | 6/2010 | Petersson et al. | 370/352 |
| 2010/0223339 A1* | 9/2010 | Cheng et al. | 709/206 |

FOREIGN PATENT DOCUMENTS

| | | | |
|---|---|---|---|
| WO | 2007/016345 A1 | 5/2007 | |
| WO | 2007/069942 A1 | 6/2007 | |

* cited by examiner

*Primary Examiner* — Larry Donaghue
(74) *Attorney, Agent, or Firm* — Coats & Bennett, P.L.L.C.

(57) ABSTRACT

A multimedia gateway for enabling a remote device to access a local device located in a private network via a residential gateway of the private network is provided. The multimedia gateway includes: connecting means for connecting to the private network and a multimedia service network, first receiving means for receiving authentication information from the remote device over the private network, storing means for storing the authentication information in a memory, second receiving means for receiving a session invite message from the remote device over the multimedia service network, the session invite message including authentication information, and authenticating means for authenticating the remote device by determining whether or not the authentication information included in the session invite message has been stored in the memory by the storing means.

18 Claims, 6 Drawing Sheets

METHOD AND ARRANGEMENT OF A MULTIMEDIA GATEWAY AND COMMUNICATION TERMINALS

TECHNICAL FIELD

The present invention generally relates to a multimedia gateway for enabling a remote device to access a local device located in a private network, a method for controlling the multimedia gateway, a communication terminal, and a method for controlling the communication terminal. The present invention particularly relates, but is not limited, to a technology in which the multimedia gateway receives authentication information from the remote device and stores it.

BACKGROUND

A network architecture called "IP Multimedia Subsystem" (IMS) has been developed by the 3rd Generation Partnership Project (3GPP) as an open standard for handling multimedia services and sessions in the packet domain (refer to http://www.3gpp.org/ftp/Specs/html-info/22173.htm). These days, various communication terminals and devices (hereinafter referred to as IMS terminals) are known that conform to an IMS standard. A typical example of an IMS terminal is a mobile phone with IMS functionality. A personal computer (PC), a personal digital assistant (PDA), etc. can also be IMS terminals if they are equipped with IMS functionality. IMS terminals can provide multimedia services by, for example, receiving video streaming from a video-streaming server over an IMS network.

However, there still exist a lot of communication terminals (hereinafter referred to as non-IMS terminals) that do not have IMS functionality. International Publication No. WO 2006/045706 discloses a multimedia gateway called a "Home IMS Gateway" (HIGA), which enables these non-IMS terminals to access the IMS network.

According to WO 2006/045706, the HIGA is located in a private network, to which at least one non-IMS terminal is connected. The HIGA includes a Session Initiation Protocol (SIP) Back-to-Back User Agent (B2BUA) for communications between non-IMS terminals and the IMS network. The HIGA also includes a SIP gateway (implemented according to 3GPP TS 24.229 and IETF RFC 3261). The SIP gateway allows inter-working between various client terminal signalling protocols and the SIP used by the IMS. For example, the SIP gateway may provide translation between ISDN-based signalling protocols and SIP. Accordingly, the non-IMS terminals may or may not have SIP functionality.

The B2BUA is equipped with an IMS Subscriber Identity Module (ISIM) application that stores an IMS Private Identity (IMPI) for respective non-IMS terminals as well as at least one IMS Public Identity (IMPU) for respective non-IMS terminals. The B2BUA handles IMS signalling on behalf of non-IMS terminals such that all signalling concerning respective non-IMS terminals is associated with the corresponding IMPI on the ISIM application. For example, if a non-IMS terminal sends an SIP REGISTER message to the HIGA, the B2BUA translates the message into an IMS REGISTER message that contains both an IMPI and an IMPU corresponding to the non-IMS terminal. Thus, the HIGA act as an IMS terminal on behalf of the non-IMS terminal, thereby enabling the non-IMS terminal to access the IMS network.

Non-IMS terminals (as well as IMS terminals) in the private network can communicate with the HIGA using an architecture according to Universal Plug-and-Play (UPnP). UPnP is developed in a multi-vendor collaboration for establishing standard device control protocols. UPnP provides peer-to-peer connectivity for communication between all types of devices in the private network, regardless of access technology, operating system, programming language, format standard, and communication protocol of the device. The UPnP technology is based on Internet standards such as IP, TCP, UDP, HTTP, and XML, and can use any transport medium such as a telephone line, Ethernet and different types of wireless media. UPnP defines base protocol sets for each type of device.

Further, UPnP supports an automatic "discovery" process, also referred to as "pairing". Using the discovery process, a local device can dynamically join a private network, obtain a private IP address, announce its name and IP address, and provide its capabilities to other devices (i.e., terminals in the private network) upon request. In this way, each local device in the private network can also obtain information on the presence and capabilities of other devices in the private network.

Digital Living Network Alliance (DLNA) is a new technology developed by leading manufacturers of electronic consumer equipment for acquiring, storing and accessing digital content such as music, films and images from any device in a private network. Devices with DLNA functionality (hereinafter referred to as DLNA devices) incorporate a networking component called "Device and Service Discovery and Control" for automatic self-configuration of networking properties such as private IP addresses, which corresponds to the above-mentioned discovery functionality of UPnP. To accomplish this functionality, DLNA uses a standardized UPnP protocol according to the UPnP Device Architecture, Version 1, providing simple and effective device networking in the home.

Nowadays, it is desired to make it possible for a remote device located outside the private network to access local devices in the same manner as when located inside the private network. A co-pending International Patent Application No. PCT/SE2006/004122, filed on Sep. 13, 2006, addresses this desire.

According to PCT/SE2006/004122, the HIGA is configured to enable the remote device to access the local devices in the private network. In addition, the HIGA has pre-stored authentication information indicating which users or remote devices are permitted to access local devices in the private network. Thus, the HIGA authenticates the remote device and prevents an unauthorized remote device from invading the private network.

However, PCT/SE2006/004122 does not address how to pre-store the authentication information in the HIGA. One possible solution could be that the user manually registers the authentication information in the HIGA, but this solution will be burdensome for the user.

The present invention has been conceived in light of the above-mentioned problem, and it is a feature thereof to reduce the user's burden to register authentication information in an HIGA, as well as to enable the remote device to access local devices by means of the HIGA.

SUMMARY

According to an aspect of the present invention, there is provided a multimedia gateway for enabling a remote device to access a local device located in a private network via a residential gateway of the private network. The multimedia gateway includes: connecting means for connecting to the private network and a multimedia service network, first receiving means for receiving authentication information from the remote device over the private network, storing means for storing the authentication information in a memory, second receiving means for receiving a session invite message from the remote device over the multimedia service network, the session invite message including authentication information, authenticating means for authenticating the remote device by determining whether or not the authentication information included in the session invite message has been stored in the memory by the storing means, establishing means for, if it is determined by the authenticating means that the authentication information included in the session invite message has been stored in the memory by the storing means, establishing connection parameters of the residential gateway for communication with the remote device, and sending means for sending the connection parameters to the remote device over the multimedia service network as a response to the session invite message.

According to another aspect of the present invention, there is provided a method for controlling a multimedia gateway for enabling a remote device to access a local device located in a private network via a residential gateway of the private network. The multimedia gateway is connected to the private network and a multimedia service network. The method includes steps of: receiving authentication information from the remote device over the private network, storing the authentication information in a memory, receiving a session invite message from the remote device over the multimedia service network, the session invite message including authentication information, authenticating the remote device by determining whether or not the authentication information included in the session invite message has been stored in the memory in the step of storing, establishing, if it is determined in the step of authenticating that the authentication information included in the session invite message has been stored in the memory in the step of storing, connection parameters of the residential gateway for communication with the remote device, and sending the connection parameters to the remote device over the multimedia service network as a response to the session invite message.

According to yet another aspect of the present invention, there is provided a communication terminal that includes: first sending means for sending authentication information to a multimedia gateway over a private network to which the multimedia gateway is connected, the authentication information being stored by the multimedia gateway, second sending means for sending a session invite message to the multimedia gateway over a multimedia service network to which the multimedia gateway is connected, said session invite message including the authentication information, receiving means for receiving connection parameters of a residential gateway of the private network from the multimedia gateway over the multimedia service network as a response to the session invite message that includes the authentication information stored by the multimedia gateway, and establishing means for establishing a communication link with the multimedia gateway or a local device located in the private network via the residential gateway based on the connection parameters.

According to another aspect of the present invention, there is provided a method for controlling a communication terminal that includes steps of: sending authentication information to a multimedia gateway over a private network to which the multimedia gateway is connected, the authentication information being stored by the multimedia gateway, sending a session invite message to the multimedia gateway over a multimedia service network to which the multimedia gateway is connected, said session invite message including the authentication information, receiving connection parameters of a residential gateway of the private network from the multimedia gateway over the multimedia service network as a response to the session invite message that includes the authentication information stored by the multimedia gateway, and establishing a communication link with the multimedia gateway or a local device located in the private network via the residential gateway based on the connection parameters.

The main advantage of the present invention is as follows. The multimedia gateway receives authentication information from the remote device over the private network, to which the multimedia gateway is connected, and stores the authentication information in the memory. Accordingly, it is not necessary for the user of the multimedia gateway to manually register the authentication information, and the user's burden is reduced.

Further features of the present invention will become apparent from the following description of exemplary embodiments with reference to the attached drawings.

DETAILED DESCRIPTION

Preferred embodiments of the present invention will now be described with reference to the attached drawings. Each embodiment described below will be helpful in understanding a variety of concepts from the generic to the more specific.

It should be noted that the technical scope of the present invention is defined by claims, and is not limited by each embodiment described below. In addition, all combinations of the features described in the embodiments are not always indispensable for the present invention.

Briefly described, the present invention enables a multimedia gateway to automatically gather authentication information related to a remote device in advance when the remote device is located in a private network, to which the multimedia gateway is connected. This automatic gathering can be achieved through the communication between the multimedia gateway and the remote device using Universal Plug and Play (UPnP).

In this description, the multimedia gateway will be referred to as a Home IMS Gateway (HIGA) connected to a multimedia service network such as an IP Multimedia Subsystem (IMS) network, and the term UPnP will be used to represent the private network architecture. However, the present invention is basically not limited to these specific terms, or to any specific protocols and standards referred to in the following.

Figure 1:
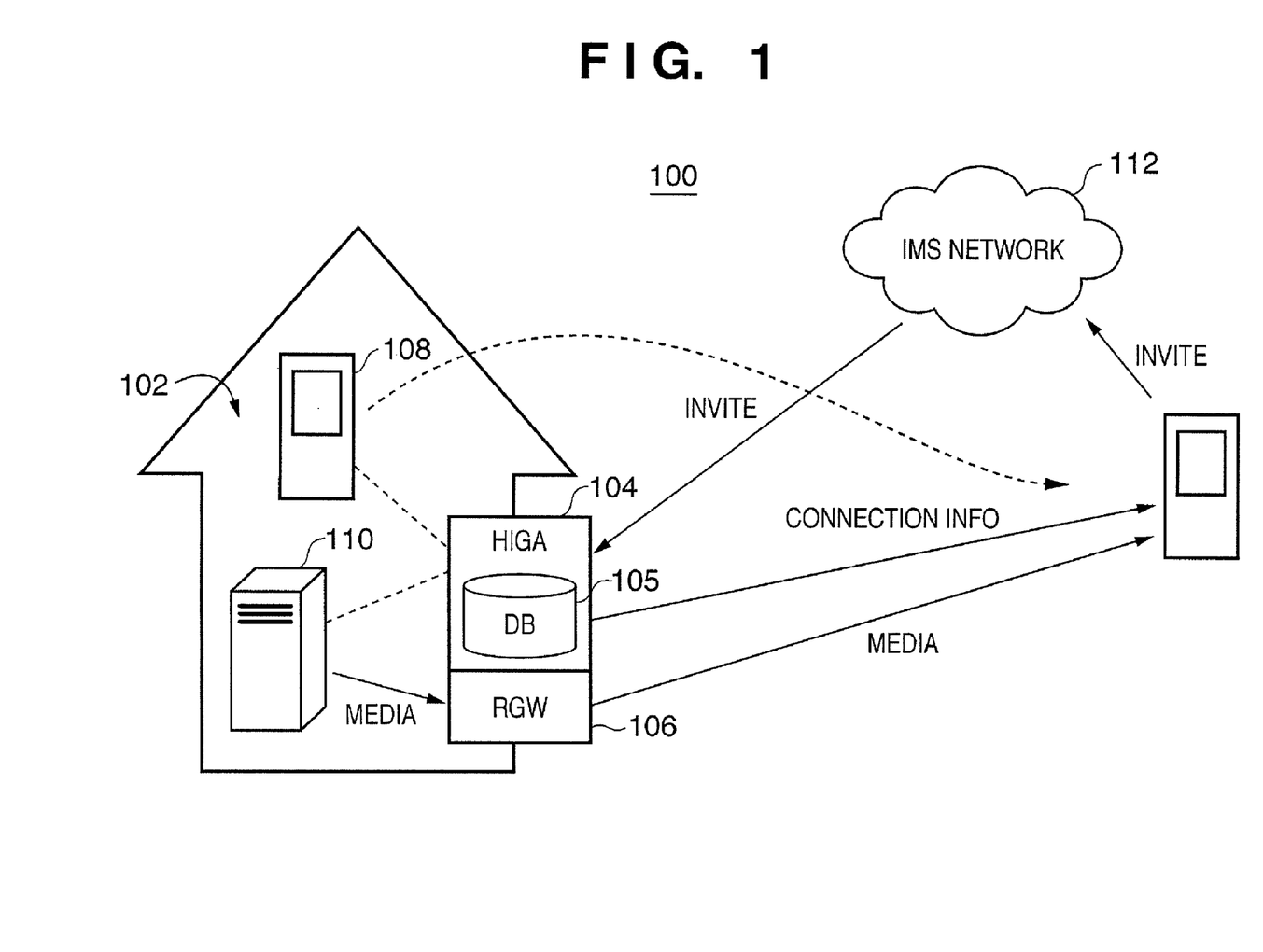
FIG. 1 illustrates a schematic scenario example of a communication system according to the embodiment.

FIG. 1 illustrates a schematic scenario example of a communication system 100 according to the present embodiment. The communication system 100 comprises a private network 102, which may be a UPnP network. Moreover, the private network 102 may be a wireless or wired local area network, which may conduct an access control. For example, only authorized devices (e.g., devices that have a valid Media Access Control (MAC) address) may join the private network 102.

The private network 102 includes an HIGA 104 for controlling multimedia services, and a residential gateway (RGW) 106 for the transport of data and media. Two local devices are shown in the private network 102, namely a wireless terminal 108 and a media server 110, although further local devices may well be present in the private network 102.

In this example, the wireless terminal 108 may move outside the private network 102, as indicated by a dashed arrow, and may be connected to a public access network (not shown). Thereby, the wireless terminal 108 becomes a remote device with regard to the private network 102 in this context.

In the present embodiment, both the remote device 108 and the HIGA 104 are equipped with IMS functionality and are capable of connecting to an IMS network 112. Further, the remote device 108 is equipped with a specific application adapted for remotely accessing local devices in the private network 102, which will generally be referred to as a "Local device Access Client" (HDAC) in the following description. The HDAC application may also be adapted to check whether or not the remote device 108 is currently connected to the private network 102.

After a user has activated the HDAC in remote device 108, a session invite message such as a regular SIP INVITE message is sent directed to the HIGA 104 in the private network 102. Existing mechanisms are then utilized for establishing a multimedia session with the HIGA 104, and the session can be used for accessing a selected local device (e.g., the media server 110) in the private network 102. Alternatively, the session can be used for accessing a proxy function in the HIGA 104 to access the private network 102. The remote device 108 then obtains local device information from the proxy function in a synchronization process.

The HIGA 104 then responds by establishing connection parameters in RGW 106, including an IP address/port number combination, which can then be used for communication with a selected local device or with a proxy function in the HIGA 104. The connection parameters are then sent to the remote device 108, preferably included in a regular session setup message in response to the session invite message. For example, the connection parameters may be included in an SDP message embedded in an SIP 200 OK message, which is a regular response message to the SIP INVITE.

In this example, the user wants to access the media server 110 in order to fetch some media content therefrom, for example music or images, for playback or display on the remote device 108. If the remote device 108 has executed a discovery process in advance when located in the private network 102, device information will already be stored in the remote device 108, such as names, device identities, and device capabilities. The user of the remote device 108 can use the device information to select a local device to be accessed. The user may even browse for media content stored in the local devices, if such supplemental information was exchanged during the discovery process and stored in the remote device 108.

If device information of local devices is available in the remote device 108, a list of local devices may be presented on a display screen to the user for selection. Depending on the implementation, the user may select a local device to be accessed before activating the HDAC in the remote device 108. If the user in this way selects the media server 110 before the session invite message is sent, the HDAC in remote device 108 may, when activated, include an identification of the selected local device (i.e., the media server 110) in, for example, an SDP message embedded in an SIP INVITE message. The local device identification may also be included in the header (e.g., "To:" field) of the SIP INVITE message. The local device identification may be a name, a private network address (e.g. an IP address or a MAC address), a Universally Unique Identifier (UUID), or any other device identification recognized in the private network 102.

On the other hand, if no local device information is available in the remote device 108, the local device information can be obtained from the HIGA 104 after receiving the connection parameters including a network address and port number. In that case, the HDAC in the remote device 108 will send a "plain" session invite message, which does not include an identification of any local device. The term "plain" is merely used to indicate the lack of such local device identification. However, an identification of the above-mentioned proxy function in the HIGA 104 may be included in the plain session invite message.

Being a part of the private network 102, the HIGA 104 participates in any executed discovery processes, and has therefore acquired device information of respective local devices in the private network 102. The HIGA 104 then stores the acquired device information in a database 105 in a memory. The discovery process may be executed by a UPnP proxy function in the HIGA 104. Thus, the HIGA 104 will send valid information on the local devices to the remote device 108, including their names, device identities and capabilities, in response to the session invite message. The user can then select a local device for communication.

In addition to device information, the HIGA 104 receives authentication information from local devices that have the authentication information. In this context, the local devices include the remote device 108 located in the private network 102. That is, when the remote device 108 is located in the private network 102, it acts in a way similar to other local devices. The HIGA 104 stores the authentication information in the database 105, and utilizes it to authenticate the remote device 108 when it tries to access the local devices from outside the private network 102. The authentication information and utilization thereof will be described in more detail later.

Figure 2:
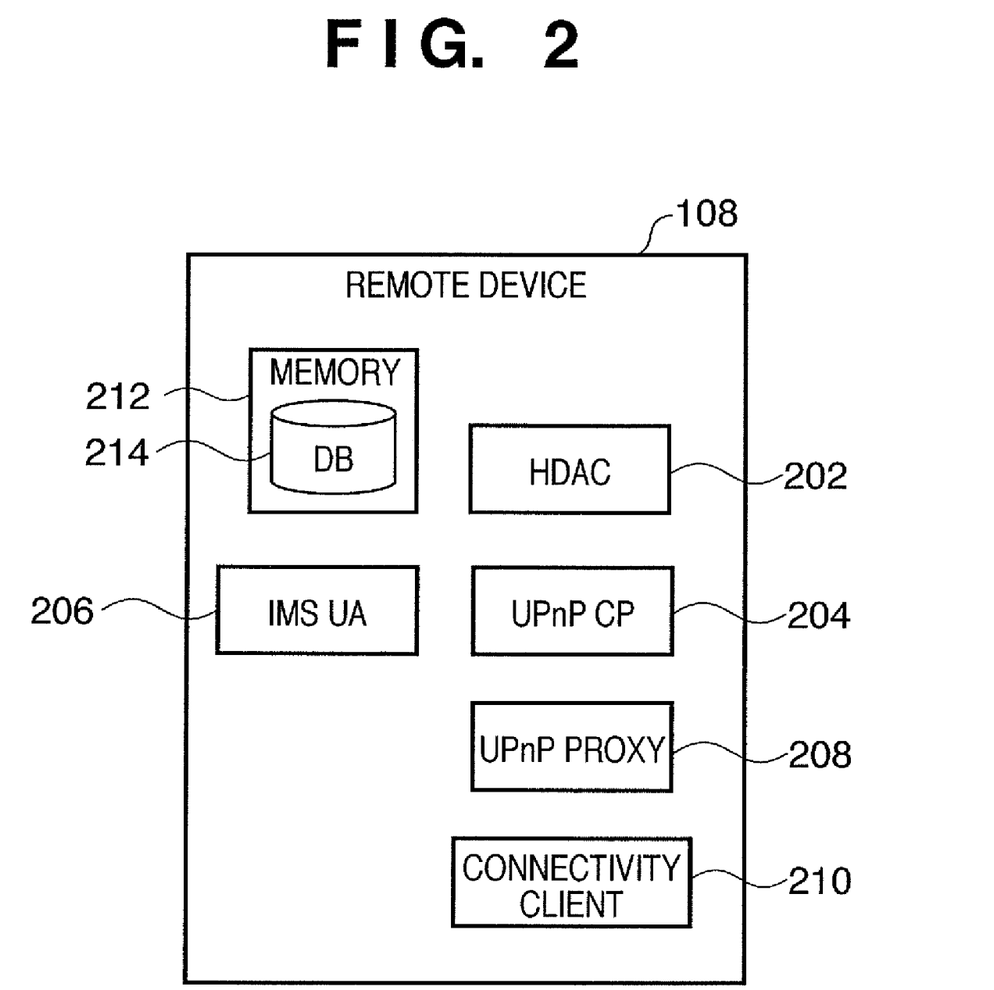
FIG. 2 is a schematic block diagram of the remote device according to the embodiment.

FIG. 2 is a schematic block diagram of the remote device 108. The remote device 108 comprises an HDAC 202 for interacting with local devices in the private network.

The remote device 108 comprises a UPnP Control Point (CP) 204. When the remote device 108 is present in the private network 102, it functions as a local device using the UPnP CP 204 for connectivity and device discovery. The remote device also comprises an IMS User Agent (UA) 206. When the remote device 108 is outside the private network 102, the IMS UA 206 is used to obtain connection parameters of the RGW 106 (e.g. a routable IP address/port number combination) for communication with local devices in the private network.

The remote device 108 further comprises a UPnP proxy 208 and a connectivity client (CC) 210. The UPnP proxy is used to synchronize UPnP discovery messages between the remote device 108 and the private network 102. The CC 210 is used to establish a connection based on the IP address of the RGW 106, which can be retrieved by means of regular SIP messages over the IMS network 112. The remote device 108 also comprises a memory 212, which includes a database 214 for storing local device information.

Figure 3:
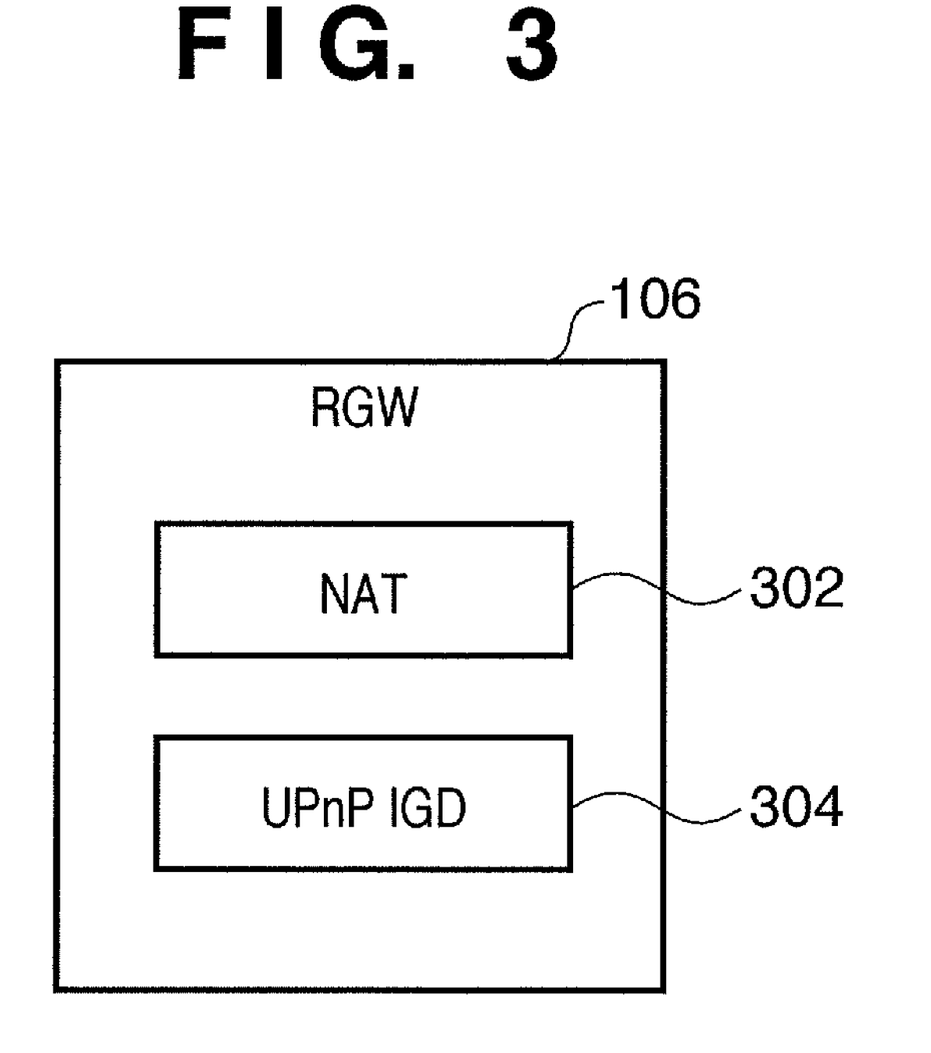
FIG. 3 is a schematic block diagram of the residential gateway (RGW) according to the embodiment.

FIG. 3 is a schematic block diagram of the RGW 106. The RGW 106 is a conventional residential gateway comprising a NAT function 302 and a UPnP Internet Gateway Device (IGD) 304, for controlling the NAT IP address and port mapping.

Figure 4:
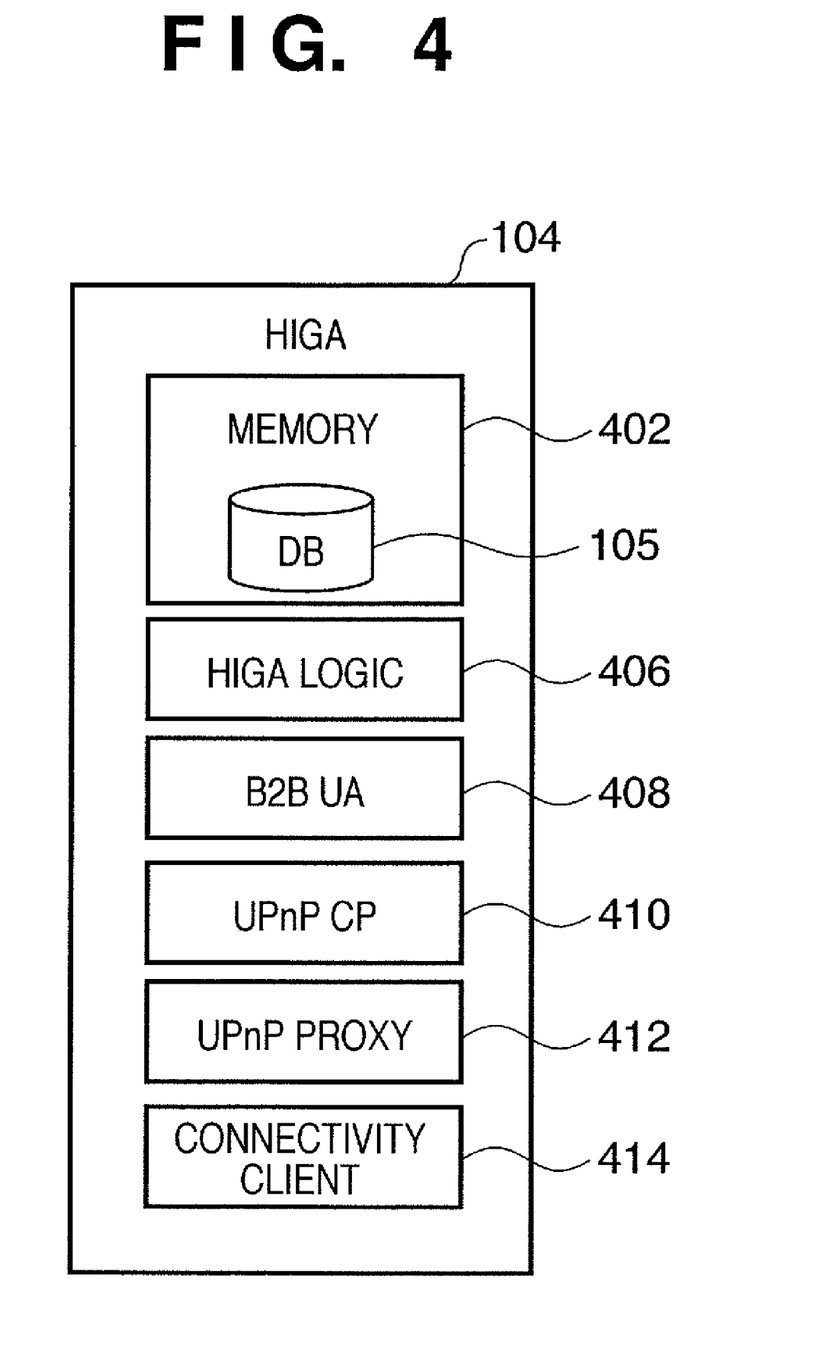
FIG. 4 is a schematic block diagram of the Home IMS Gateway (HIGA) according to the embodiment.

FIG. 4 is a schematic block diagram of the HIGA 104. The HIGA 104 comprises a memory 402, which includes a database 105 for storing private IP addresses of local devices and device information of the local devices gathered by means of a discovery process as described above. The device information of the local devices stored in the database 105 may also include names and capabilities of the local devices. The private IP addresses and device information of the local devices may be stored in separate databases, depending on the implementation.

The HIGA 104 further comprises an HIGA logic function 406 and a B2BUA 408 for communications between local devices and the IMS network 112.

The HIGA 104 also comprises a UPnP CP 410, a UPnP proxy 412, and a CC 414. The UPnP proxy 412 can be utilized for conveying, for example, multicast UPnP discovery messages to the remote device 108, in order to facilitate the synchronization of the device information between the HIGA 104 and the remote device 108.

Thus, the HIGA 104 connects to the private network 102 and the IMS network 112 by means of the UPnP CP 410 and the B2BUA 408.

It should be noted that FIGS. 2-4 illustrate the respective structures purely logically, and a skilled person will be able to implement these functions in practice by means of any suitable hardware and software.

Moreover, functionality of each block shown in FIGS. 2-4 is generally implemented by a processor (not shown) executing dedicated software. However, a person skilled in the art will understand that they may be implemented by dedicated hardware, or the combination of software and hardware. Accordingly, for example, if a computer with a CPU and a memory is provided with a program that causes the CPU to execute each functionality of the HIGA 104, the computer can be deemed as the HIGA 104.

Figure 5:
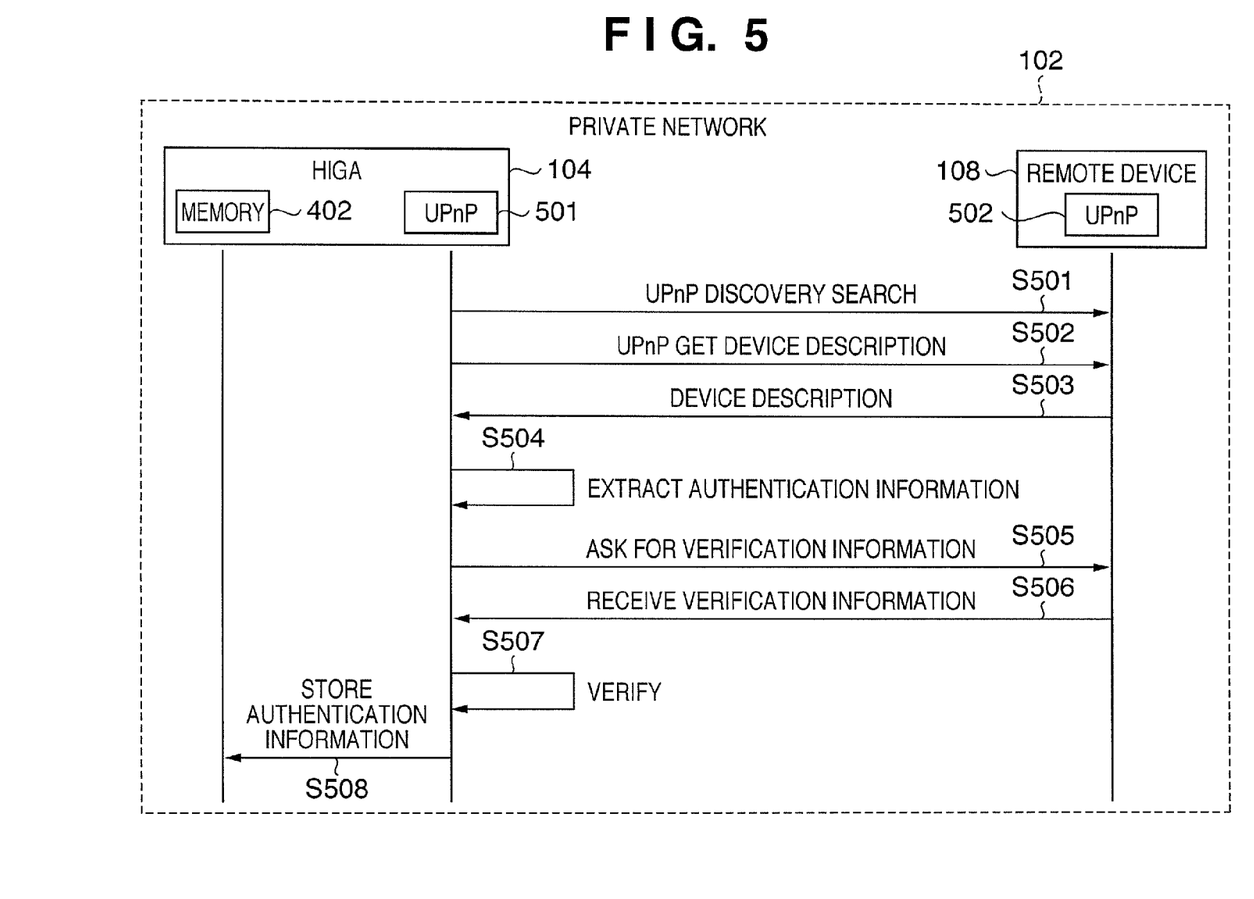
FIG. 5 is a sequence diagram showing the process where the HIGA receives authentication information from the remote device and stores the authentication information in the memory.

FIG. 5 is a sequence diagram showing the process where the HIGA 104 receives authentication information from the remote device 108 and stores the authentication information in the memory 402.

In FIG. 5, UPnP functionality 501 comprises the UPnP CP 410, the UPnP proxy 412, and the connectivity client 414 shown in FIG. 4. Also, UPnP functionality 502 comprises the UPnP CP 204, the UPnP proxy 208, and the connectivity client 210 shown in FIG. 2. After the remote device 108 joins the private network 102 using the UPnP functionality 502, the process of FIG. 5 starts. As described above, the private network 102 may prevent unauthorized devices from joining the private network 102. Thus, it is possible for the owner of the HIGA 104 to restrict the devices that are permitted to access the private network 102 remotely as a result of the process of FIG. 5.

In step S501, the HIGA 104 transmits a UPnP Discovery message to the private network 102 in order to search for a new device (e.g., the remote device 108), which will access the private network 102 from outside the private network 102. Alternatively, the remote device 108 may transmit a UPnP Discovery message to the private network 102 in order to search for the HIGA 104.

In step S502, the HIGA 104 asks the remote device 108 for its device description.

In step S503, the HIGA 104 receives the device description, which may contain authentication information, from the remote device 108. The authentication information may comprise information associated with the remote device 108 or the user of the remote device 108. For example, the authentication information may comprise a model number and a serial number of the remote device 108, or an IMPU stored in a UICC of the remote device 108.

In step S504, the HIGA 104 extracts the authentication information from the device description.

In step S505, the HIGA 105 asks the remote device 108 for verification information. The verification information is, for example, a password of the HIGA 104. The remote device 108 prompts the user to input the password via a user interface of the remote device 108, and sends the input password to the HIGA 104. Alternatively, the remote device 108 may automatically send a pre-set password to the HIGA 104.

In step S506, the HIGA 104 receives the verification information from the remote device 108.

In step S507, the HIGA 104 verifies the received verification information.

In step S508, the HIGA 104 stores the authentication information, which was extracted in step S504, in the memory 402 if the verification information is valid.

Although the use of verification information is optional, it enhances the security of the private network 102. The private network 102 itself may be protected so that only authorized devices can join it. However, there is the case where a visitor (e.g., a friend of the owner of the HIGA 104) wants his/her device to join the private network 102. In this case, the owner of the HIGA 104 may permit the visitor's device to join the private network 102, but the owner may not want the visitor's device to access the private network 102 remotely. Accordingly, the verification information increases the flexibility of the access control. That is, the owner of the HIGA 104 can flexibly decide which device's authentication information is to be stored in the memory 402 of the HIGA 104.

In some embodiments, the device description, which the HIGA 104 receives in step S503, does not include authentication information. In this case, in step S504, the HIGA 104 may instead ask the remote device 108 for its service description, and request the remote device 108 to send the authentication information according to the service description.

As a result of the process of FIG. 5, a set of authentication information is stored in the memory 402. Thus, the HIGA 104 is ready to decide which device is permitted to access the private network 102 remotely based on the set of authentication information.

Figure 6:
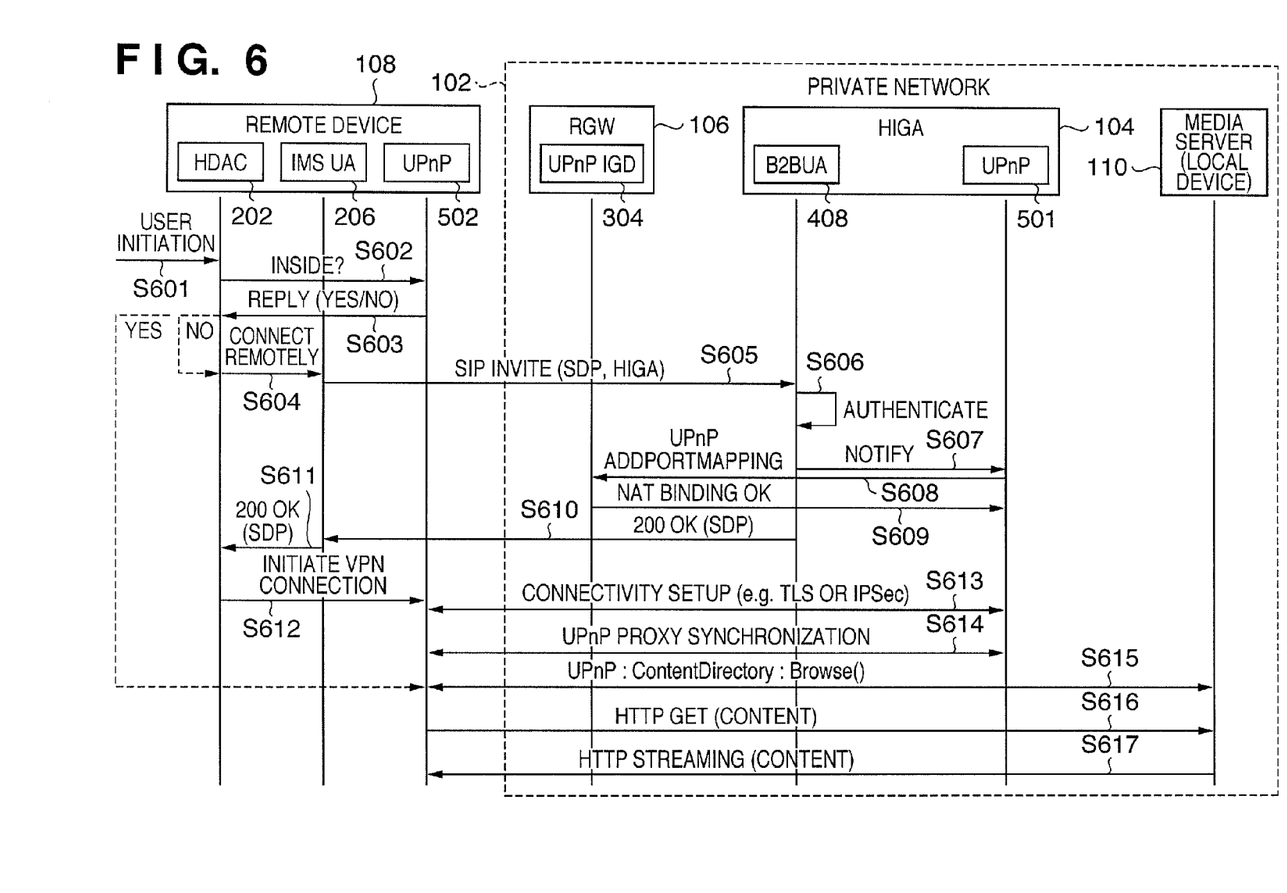
FIG. 6 is a sequence diagram showing the process where the remote device accesses local devices remotely.

FIG. 6 is a sequence diagram showing the process where the remote device 108 accesses local devices (e.g., the media server 110) remotely (i.e., outside from the private network 102).

In step S601, a user of the remote device 108, who wants to access local devices, activates the HDAC 202. This process can be performed in the same manner when the remote device 108 is located either inside or outside the private network 102. As mentioned above, the user may have selected a local device (e.g., the media server 110) before activating the HDAC 202 in step S601.

In step S602, the HDAC 202 asks the UPnP CP 204 in the UPnP functionality 502 whether or not the remote device 108 is currently connected to and located inside the private network 102.

In step S603, in response to the query of step S602, the UPnP functionality 502 replies either "yes" (inside, connected) or "no" (outside, connect remotely). In the case that the HDAC 202 receives "yes", the process proceeds to step S615, and the UPnP functionality 502 can access the media server 110 without the support of the IMS UA 206 because the remote device 108 is inside the private network 102; otherwise the process proceeds to step S604.

In step S604, the HDAC 202 initiates the IMS UA 206 to send an IMS-based SIP INVITE as a session invite message, which is directed to the HIGA 104. The SIP INVITE includes the authentication information (e.g., IMPU stored in the UICC of the remote device 108), and may also include an identification of a selected local device, that is, the media server 110 in this example.

In step S605, the IMS UA 206 issues the SIP INVITE, which is received by the B2BUA 408 of the HIGA 104 over the IMS network 112.

In step S606, the B2BUA 408 authenticates the remote device 108 (or the user thereof) by determining whether or not the authentication information included in the SIP INVITE has been stored in the memory 402 (in step S508 of FIG. 5). If it is determined that the authentication information included in the SIP INVITE has been stored in the memory 402, the remote device 108 is permitted to access local devices remotely and the process proceeds to step S607; otherwise the B2BUA rejects the attempted access from the remote device 108 and the process ends (not shown).

In step S607, the B2BUA 408 notifies the UPnP CP 410 in the UPnP functionality 501 of the received SIP INVITE.

In step S608, in response to the notification of step S607, the UPnP CP 410 in the UPnP functionality 501 requests the UPnP IGD 304 in the RGW 106 to perform a NAT binding. The NAT binding is performed concerning the IP address and port number of the remote device 108, which are normally supplied in the SDP message of the SIP INVITE, and the local IP address and the port number of the selected local device. The UPnP functionality 501 can retrieve the local IP address of the selected local device from the database 105 in the memory 402, using the received local device identification included in the SIP INVITE. In the case that any local devices are not selected in the SIP INVITE, the NAT binding is performed concerning the local IP address and the port number of the UPnP proxy 412 in the UPnP functionality 501 instead of the local device.

In step S609, the UPnP IGD 304 confirms the NAT binding. Hence, steps S608 and S609 represent the establishment of connection parameters of the private network 102.

In step S610, after the connection parameters have been established for communication with the local device, the B2BUA 408 sends a standard acknowledge message in SIP (i.e., a 200 OK message) to the IMS UA 206 over the IMS network 112. The 200 OK message includes an SDP message containing the connection parameters, which the remote device 108 can use for communicating any messages and data to and from the selected local device or the UPnP proxy 412.

In step S611, the IMS UA 206 forwards the SDP message to the HDAC 202.

In step S612, the HDAC 202 initiates the connectivity client 210 in the UPnP functionality 502 to establish a VPN tunnel (e.g. IPSec) to the selected local device or the UPnP proxy 412 in the UPnP functionality 501, using the connection parameters received in the SDP message in step S611. Note that establishing the VPN tunnel is optional although the VPN tunnel contributes to enhance the security.

In step S613, the UPnP functionality 502 establishes the VPN tunnel as requested in step S612. The VPN tunnel may, for example, be established according to the technique disclosed in the International Publication No. WO 2006/079891.

As a result of the processes in the above steps, the remote device 108 is now able to communicate with local devices (including the UPnP proxy 412) as if it was located in the private network 102. The following steps indicate processes as an example in which the remote device 108 receives video streaming from the media server 110.

In step S614, in the case that any local devices are not selected in the SIP INVITE in step S605, the UPnP proxy 208 in the UPnP functionality 502 synchronizes with the UPnP proxy 412 in the UPnP functionality 501 with respect to local device information. Thus, the remote device 108 discovers local devices and available services in the private network 102.

In step S615, the UPnP functionality 502 receives a content list of the media server 110 so that the user of the remote device 108 can browse for media content in the media server 110.

In step S616, the UPnP functionality 502 selects media content on the media server 110 by sending an HTTP GET command to the media server 110.

In step S617, the UPnP functionality 502 receives the selected media content from the media server 110.

It should be noted that the communication between the remote device 108 and media server 110 in steps S615, S616, and S617 is conveyed over the RGW 106 using the established NAT binding.

As described above (particularly with reference to FIG. 5), the present invention is advantageous in that the HIGA 104 automatically collects and stores authentication information of remote devices (e.g., the remote device 108) when they are inside the private network 102 to which the HIGA is connected. Therefore, it is not necessary for the owner (user) of the HIGA 104 to manually register the authentication information, and the user's burden is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. A multimedia gateway for enabling a remote device to access a local device located in a private network via a residential gateway of said private network, said multimedia gateway comprising one or more processing circuits configured to:

connect to said private network and a multimedia service network;

receive authentication information from the remote device over the private network when the remote device is located in the private network;

store the authentication information in a memory;

receive a session invite message from the remote device over the multimedia service network, said session invite message including authentication information;

authenticate the remote device by determining whether or not the authentication information included in the session invite message has been stored in the memory;

establish connection parameters of the residential gateway for communication with the remote device if it is determined that the authentication information included in the session invite message has been stored in the memory; and send the connection parameters to the remote device over the multimedia service network as a response to the session invite message.

2. The multimedia gateway according to claim 1, said gateway is configured to periodically search for the remote device in the private network, and request the remote device to send the authentication information if the remote device is found.

3. The multimedia gateway according to claim 2, wherein the private network is a Universal Plug and Play (UPnP) network, and wherein the gateway is configured to search for the remote device by sending a UPnP Discovery message to the private network.

4. The multimedia gateway according to claim 3, wherein the gateway receives a UPnP Description of the remote device, the UPnP Description including the authentication information.

5. The multimedia gateway according to claim 1, wherein the gateway is configured to receive verification information from the remote device, and to store the authentication information in the memory only when the verification information is valid.

6. The multimedia gateway according to claim 1, wherein the authentication information comprises information associated with the remote device or a user of the remote device.

7. The multimedia gateway according to claim 1, wherein the session invite message is a Session Initiation Protocol (SIP) INVITE message.

8. The multimedia gateway according to claim 7, wherein the multimedia service network is an IP Multimedia Subsystem (IMS) network.

9. The multimedia gateway according to claim 8, wherein the authentication information comprises an IMS Public User Identity or an IMS Private User Identity.

10. The multimedia gateway according to claim 1, wherein if the session invite message includes identification of the local device, the gateway is configured to establish the connection parameters including a private address and a port number of the local device, and, if the session invite message does not include the identification of the local device, the gateway is configured to establish the connection parameters including a private address and a port number of said multimedia gateway.

11. A communication terminal comprising one or more processing circuits that are configured to:
send authentication information to a multimedia gateway over a private network to which the multimedia gateway is connected when the communication terminal is located in the private network, the authentication information being stored by the multimedia gateway;
send a session invite message to the multimedia gateway over a multimedia service network to which the multimedia gateway is connected, said session invite message including the authentication information;
receive connection parameters of a residential gateway of the private network from the multimedia gateway over the multimedia service network as a response to the session invite message that includes the authentication information stored by the multimedia gateway; and
establish a communication link with the multimedia gateway or a local device located in the private network via the residential gateway based on the connection parameters.

12. The communication terminal according to claim 11, wherein the private network is a UPnP network, and wherein the communication terminal is configured to send a UPnP Description of said communication terminal, the UPnP Description including the authentication information.

13. The communication terminal according to claim 11, wherein the communication terminal is configured to send verification information that is used to determine whether or not the multimedia gateway stores the authentication information sent by the communication terminal.

14. The communication terminal according to claim 11, wherein the authentication information comprises information associated with said communication terminal or a user of said communication terminal.

15. The communication terminal according to claim 11, wherein the session invite message is a SIP INVITE message.

16. The communication terminal according to claim 11, wherein the connection parameters include a private address and a port number of the local device, if the session invite message includes identification of the local device, and, if the session invite message does not include the identification of the local device, the connection parameters include a private address and a port number of the multimedia gateway.

17. A multimedia gateway for enabling a remote device to access a local device located in a private network via a residential gateway of said private network, said multimedia gateway comprising a B2BUA, a UPnP CP, or both, configured for:
connecting to said private network and a multimedia service network;
receiving authentication information from the remote device over the private network when the remote device is located in the private network;
storing the authentication information in a memory;
receiving a session invite message from the remote device over the multimedia service network, said session invite message including authentication information;
authenticating the remote device by determining whether or not the authentication information included in the session invite message has been stored in the memory;
establishing connection parameters of the residential gateway for communication with the remote device, if it is determined that the authentication information included in the session invite message has been stored in the memory; and
sending the connection parameters to the remote device over the multimedia service network as a response to the session invite message.

18. A communication terminal comprising:
a UPnP CP configured for sending authentication information to a multimedia gateway over a private network to which the multimedia gateway is connected when the communication terminal is located in the private network, the authentication information being stored by the multimedia gateway; and
an IMS UA configured for: sending a session invite message to the multimedia gateway over a multimedia service network to which the multimedia gateway is connected, said session invite message including the authentication information; and receiving connection parameters of a residential gateway of the private network from the multimedia gateway over the multimedia service network as a response to the session invite message that includes the authentication information stored by the multimedia gateway; and
wherein the UPnP CP is further configured for establishing a communication link with the multimedia gateway or a local device located in the private network via the residential gateway based on the connection parameters.

* * * * *

UNITED STATES PATENT AND TRADEMARK OFFICE
CERTIFICATE OF CORRECTION

| | |
|---|---|
| PATENT NO. | : 8,127,028 B2 |
| APPLICATION NO. | : 12/678295 |
| DATED | : February 28, 2012 |
| INVENTOR(S) | : Skog et al. |

It is certified that error appears in the above-identified patent and that said Letters Patent is hereby corrected as shown below:

On the Title Page, in Field (75), under "Inventors", in Column 1, Line 1, delete "Hasselby" and insert -- Hässelby --, therefor.

In Column 8, Line 9, delete "105" and insert -- 104 --, therefor.

Signed and Sealed this
Seventh Day of August, 2012

David J. Kappos
*Director of the United States Patent and Trademark Office*